United States Patent [19]

Baycura

[11] 4,175,380
[45] Nov. 27, 1979

[54] LOW NOISE GAS TURBINE

[76] Inventor: Orestes M. Baycura, 2238 Central Park Dr., Campbell, Calif. 95008

[21] Appl. No.: 889,704

[22] Filed: Mar. 24, 1978

[51] Int. Cl.² ............................................. F02C 5/00
[52] U.S. Cl. ................................. 60/39.06; 60/39.77; 60/247
[58] Field of Search .................... 60/39.76, 39.77, 247, 60/248, 249, 39.06, 39.02

[56] References Cited

U.S. PATENT DOCUMENTS

| | | | |
|---|---|---|---|
| 2,523,379 | 9/1950 | Kollsman | 60/39.77 |
| 2,684,571 | 7/1954 | Wright | 60/247 |
| 3,606,867 | 9/1971 | Briffa | 60/39.76 |
| 3,738,290 | 6/1973 | Belter | 60/39.77 |

Primary Examiner—Louis J. Casaregola
Attorney, Agent, or Firm—Richard S. Sciascia; Paul N. Critchlow

[57] ABSTRACT

At least two gas combustion tubes disposed in an end-to-end relationship provide an elongate combustion chamber closed at both ends. A fuel mixture admitted alternatively into each closed end is ignited for generating positive pressure pulses traveling from one end of the chamber to the other. The combustion energy at one end compressed the fuel mixture from the other to permit ignition. A standing wave thus is formed having a pressure anti-node at each of the closed ends. The combustion chamber length is fixed relative to the frequency of the alternating ignitions to produce in the chamber a standing wave having an even number of quarter wave lengths with pressure anti-nodes and velocity nodes at its ends. The wave form thus has a pressure node and velocity anti-node at its mid-point. Combustion gases are discharged at this mid-point to a storage reservoir and, from the reservoir, to the propulsion turbine. High combustion pressures effectively cancel at the pressure node discharge point to permit cancellation of pressure pulse noise from the turbine exhaust. High velocity gases discharged into the reservoir are smoothed by storage to permit delivery to the turbine at a relatively fixed and high velocity.

10 Claims, 5 Drawing Figures

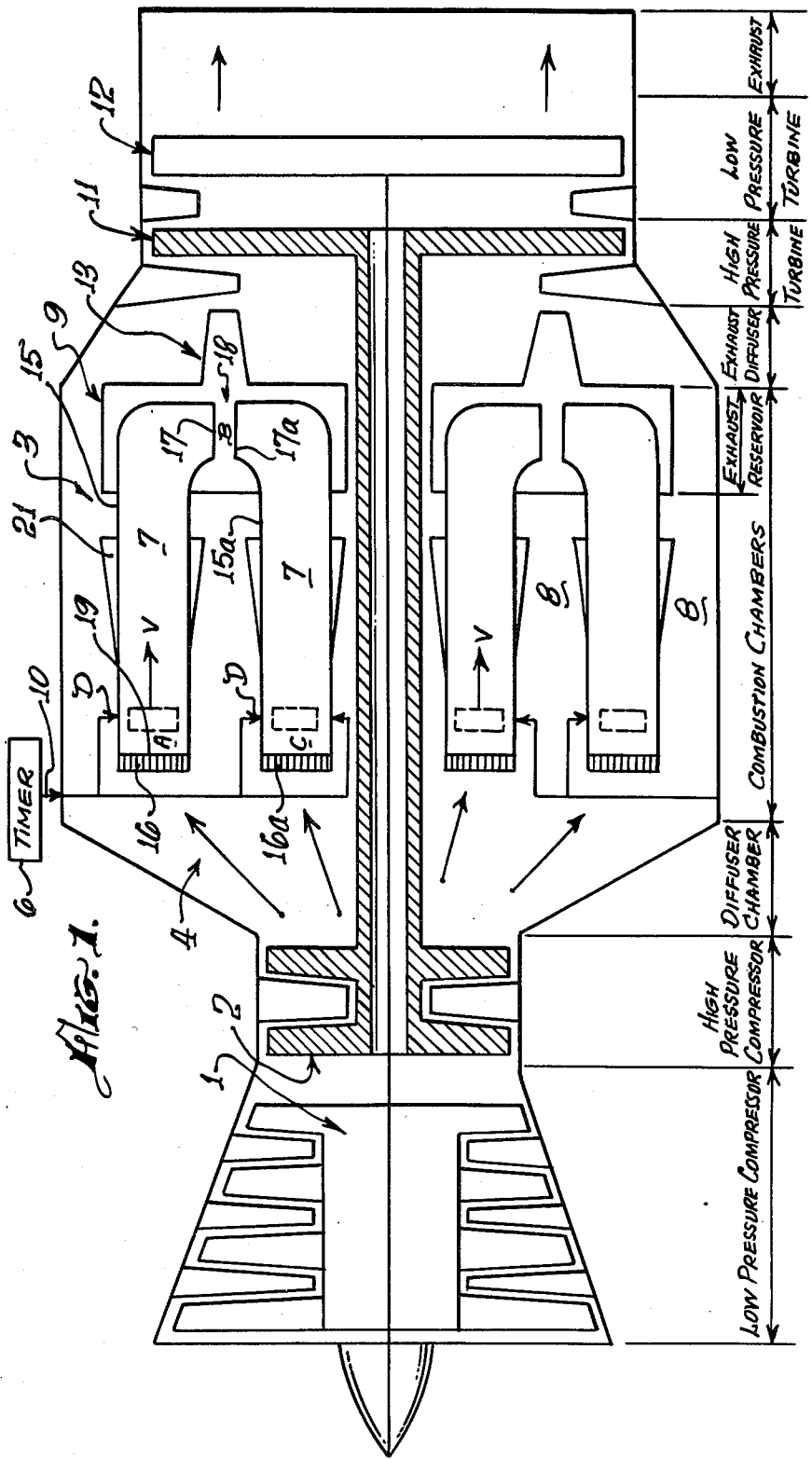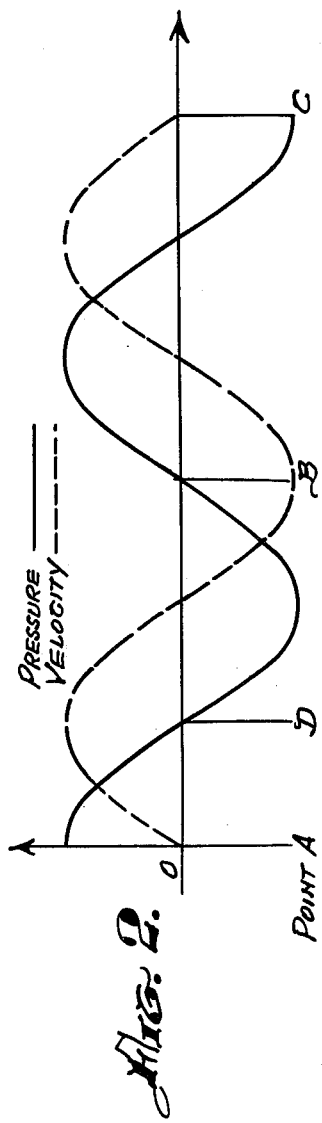

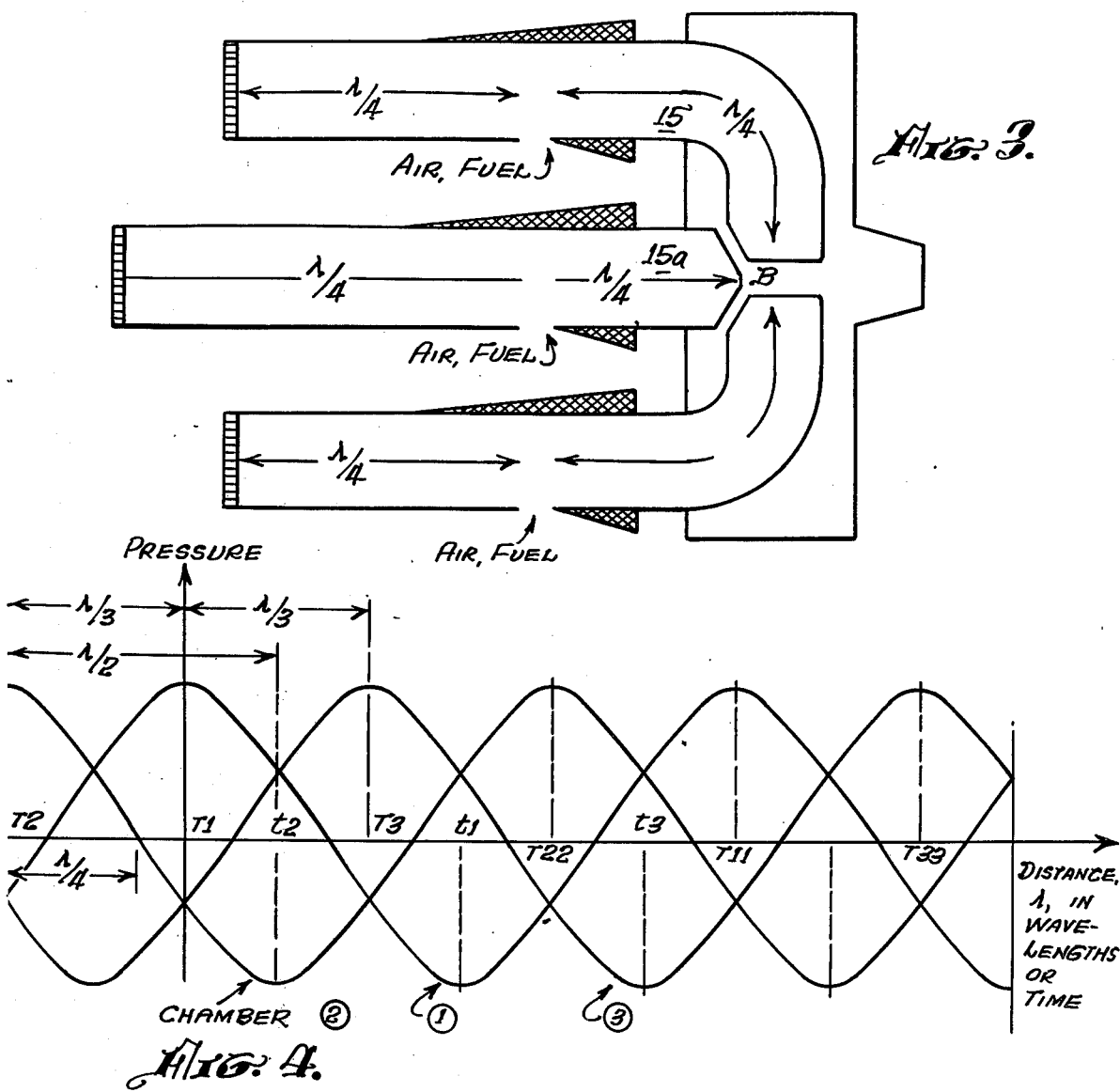
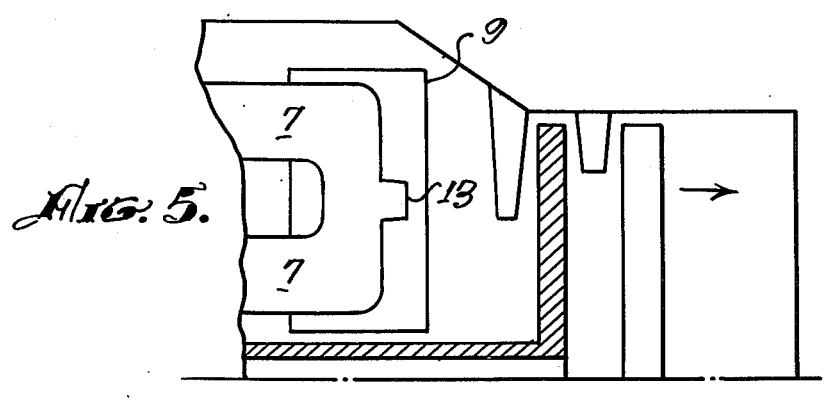

LOW NOISE GAS TURBINE

BACKGROUND OF THE INVENTION

The invention described herein may be manufactured and used by or for the Government of the United States of America for governmental purposes without the payment of any royalties thereon or therefore.

The present invention relates to jet engine gas turbines and, in particular, to means for reducing the exhaust noise of these turbines.

The combustion process of conventional gas turbines produces high velocity gases that are vented directly into the atmosphere to produce a wide range of audible frequencies having large amplitudes at all frequencies. The high noise level produced, for example, by jet aircraft engines not only is a nuisance, it also may produce serious physical irritation and trauma both to the ears and the lungs.

These have been many efforts to reduce the noise. Optimistically, of course, the efforts hope to reduce it to a level below that of the air frame noise of the flying aircraft. Such a reduced level would enable quiet airport operations as well as covert military air operations. However, as far as is known, efforts along this line have not met with any significant success.

The primary object of the invention is to provide a relatively quiet gas turbine in which the high pressure waves resulting from gas combustion are effectively cancelled. Other objects and their attendant advantages will become more apparent in the ensuing description.
dr

BRIEF DESCRIPTION OF THE DRAWINGS

The present invention is illustrated in the accompanying drawings of which:

FIG. 1 is a schematic view of a present gas turbine;

FIG. 2 is a plot of a standing wave formed in the combustion chamber of the turbine;

FIG. 3 is a modified form of a single combustion unit of the gas turbine;

FIG. 4 is a plot illustrating a firing sequence for the FIG. 3 modification, and FIG. 5 is a partial diagramatic illustration of yet another embodiment.

DETAILED DESCRIPTION OF THE INVENTION

FIG. 1 illustrates a somewhat conventional gas turbine jet engine of the type used to propel aircraft or the like. As shown, it includes such conventional components as a low pressure compressor 1 and a high pressure compressor 2 that supplies air to a combustion chamber portion 3 through a diffuser system 4. Although diffuser 4 is depicted essentially by the use of air flow arrows it will be recognized that any conventional conduit system such as are used in many similar turbine engines can be employed. In fact, the FIG. 1 illustration is a conventional schematic in which no attempt is made to show the large variety of conventional systems or components such as those normally used to control and regulate the inflow or the timing of the air and gas into the combustion chambers. The fact that such systems are intended is implicit in the use of timer block 6 and fuel supply lines 10. The type of mechanisms needed for achieving the purposes of the present invention will be apparent in the ensuing description. They can be supplied in any number of conventional manners. The principle features of the invention reside in the use of particular combustion units generally designated in FIG. 1 as units 7 and 8 which, in effect, are combustion tubes supplying the energy of burning gases to a reservoir 9.

The energy stored in reservoir 9 is applied to a high pressure turbine 11 and a low pressure turbine 12 through a diffuser 13 to drive turbines 11 and 12 and produce the propulsion force for the aircraft. In the usual manner, turbines 11 and 12 are coupled to intake compressors 2 and 3.

The principle purpose of the invention is to minimize exhaust gas noise. This purpose is achieved primarily by utilizing specially formed combustion units 7 and 8 to store the energy of the combustion at a low pressure in reservoir 9. Although only two combustion units are shown in the drawing, it will be recognized that any number of these units can be employed in any desired arrangement such as the usual circumferentially-spaced disposition.

The description will be with reference to a single unit, such as unit 7 which, as shown, is formed of a pair of elongate combustion tubes or pipes 15 and 15a each of which has a closed end portion 16 and 16a in which the combustible fuel and gas mixture is ignited. The other end portions of tubes 15 and 15a are directed one towards the other and are provided with open ends 17 and 17a facing one another across a narrow gap 18. For descriptive purposes the closed ends of the tubes are designated A and C while the open ends are designated B. More specifically, the letter B is intended to designate a discharge opening through which the burning gases are discharged into reservoir 9 and, as will be apparent, discharge opening B is formed by open ends 17, 17a as well as gap or spacing 18. Fuel for the combustion is supplied to each of the combustion tubes through fuel manifold 10 and, as shown, enters at point D. Ignition can be achieved in any desired manner such as by a conventional automobile spark plug. However, as shown, a ceramic liner 19 is used for this purpose. The liner is heated externally to provide a starting ignition following which it retains heat between explosions to assure subsequent combustion. Such heating elements are conventional and their operation is well known.

Considering a combustion cycle of unit 7, the fuel entering at D mixes with air from the diffuser in the combustion chamber near point A and the mixture is ignited by liner 19 to generate a pressure pulse of compressed gas designated as Pulse V which moves with a velocity V to the right. At this instant, the pressure at point C in tube 15a is relatively low and the pressure in this region permits another increment of fuel and air to enter tube 15a near point C. The relatively high pressure pulse V initiated in tube 15 flows toward the low pressure region C and, instead of being exhausted, the pulse traverses gap 18 and proceeds into tube 15a to compress the air fuel increment present at point C. This compressed increment then is ignited to start a new pressure pulse back to point A which, in the interim, has become a low pressure region and has received a second air-fuel increment. This second increment then is compressed by the pressure pulse from point C and when compressed is ignited to generate a new pulse. The cycle obviously is self-sustaining and repetitious with the result that a standing wave of pressure and velocity forms along the path A, B and C. Such a standing wave is illustrated in FIG. 2 plot, and, as will be appreciated, any such wave is characterized by the fact that it has a pressure anti-nodes at points A and C.

A significant feature of the invention is that the length of tubes 15 and 15a are designed so that the overall length of the combustion chamber or fluid column represented by path A, B and C is a particular function of a quarter wave length of the standing wave with the total length being such that centrally-disposed discharge opening B lies precisely at a pressure node of the standing wave. The design considerations for the combustion units are clearly shown in the FIG. 2 plot. This plot shows the standing wave in path A, B and C when the explosion takes place at A. At A and C the pressures are opposite and thus permit the high pressure at A caused by the explosion to move to the lower pressure at C. Fuel and air enters at D where, as shown, the pressure is a constant and the velocity is a maximum to promote better mixing of fuel and air. Point B, as will be noted, is the discharge opening for pipes 15 and 15a and it lies at a pressure node and a velocity anti-node. Consequently, the energy of the burning gases is stored in exhaust reservoir 9 at a low pressure point in the standing wave pattern so that, in effect, the high pressure of the combustion are effectively cancelled by the destructive interference obvious in the wave form. Cancellation of high pressures effectively cancels the noise produced by these pressures and, since the pressures of the gases stored in the reservoir are cancelled, the exhaust noise produced by these pressures is also effectively cancelled. However, the velocity of the gas is a maximum so that a high velocity point is used to produce the propulsion of the engine and the air frame attached to it. This high velocity gas, however, should be smoothed out to drive the turbine and the smoothing is accomplished by reservoir 9 which receives the gases from point B where the pressure is cancelled. This keeps the velocity nearly fixed and performs work by leaving the exhaust reservoir through diffuser 13 to drive the turbine. Operation is possible without the use of diffuser 13 simply by adding an appropriate opening or hole in reservoir 9.

Assurance that discharge opening B lies at a pressure node and velocity anti-node of the standing wave is achieved by fixing the length of the combustion chamber or, in other words, the total length of path A, B, C. In particular, this length must be an even multiple of a quarter length of the standing wave. For example, as apparent in FIG. 2, the standing wave from point A to point C is one and one-half wave lengths or six times the quarter wave length. The shortest possible length for path A, B, C is provided when each part A-B and B-C are two-quarters wave lengths long. There is no limit to the total upper length as long as the quarter wave lengths are an even integer. To assure the correct length and path A, B, C, it, of course, is necessary to determine the wave length and the quarter wave length of the standing wave formed in the unit. This determination can be made since, as is known, the speed of sound is proportional to the square root of the absolute temperature which is the burning temperature. Also, the speed of sound through the combustion tubes will equal the frequency multiplied by the wave length. Consequently, by knowing the burning temperature, the speed of sound can be determined and, by choosing a particular frequency of operation, the wave length and quarter wave length can be found. A correction for the open ends of the tubes can be computed from standard formulae for end effects. As desired, cooling of the combustion chambers can be achieved by using cooling fins 21 or the like. Because the combustion tubes are closed, cooling is important. The cooling is the result of the diffuser air passing over fins 21.

The advantages in the described arrangement are derived by employing a non-touching pair of combustion tubes placed so that their open ends face each other to cancel high pressure but not to cancel the high velocities. Consequently, little or no noise is admitted to the atmosphere and a relatively silent turbine operation can be achieved for both military and civilian aircraft. Further, the combustion in the chambers does work by compressing the fuel-air mixture at the low pressure end of the unit with the result that the number of compression stages required in the low and high pressure compressors is reduced. This fact, in turn, saves weight and reduces fuel consumption over conventional, continuous burning turbines. However, it is to be recognized that the arrangement illustrated in FIG. 1 constitutes a preferred form of the invention and that other arrangements also can achieve the desired purposes. In particular, it is not absolutely essential that tubes 15 and 15a be spaced apart so as to provide non-touching pairs. Instead, the tubes can be interconnected to provide a continuous length defining the overall combustion chamber and, in this event, an opening can be provided centrally of the chamber at point B to permit gases to discharge into reservoir 9. Such an arrangement is schematically illustrated in FIG. 5. In any event, the combustion chamber provided by the tubes can be considered as a single elongate chamber having its discharge opening located at its mid-point.

FIG. 3 illustrates a system utilizing three combustion tubes 15, 15a and 15b, rather than the two tubes shown in FIG. 1. As shown, the three tubes have a common discharge opening again indicated by letter B. A firing sequence for the multiple tube arrangement of FIG. 3 is shown in FIG. 4. In the sequence, chamber 15a fires at $T_2$ and starts its wave down the tube. $T_1$, ⅓ of a wave length later, chamber 15 is fired and ⅓ of a wave length after $T_1$ at $T_3$ chamber 15a is fired. At $T_2$, chamber 15a has a low pressure and fuel, consequently, is injected into it at a point where the pressure is constant, namely, ¼ of a wave length from its end. Similarly, at $T_1$ and $T_3$, chambers 15 and 15b have low pressure points and the fuel-air mixture is injected at the quarter wave length distance from their ends. At $T_{22}$, chamber 15a has had the fuel compressed from the reflected wave and it fires again to start the cycle. At $T_{11}$, chamber 15 fires and at $T_{33}$, chamber 15b fires and the sequence continues.

The number of chambers that can be joined together can be 3, 6, 9, 12 or higher multiples of 3. Of course, the higher multiples produce more power as in 6-phase or 9-phase electrical circuits. Further, if the tubes or chambers are circular, it is possible to increase the combustion pressures by raising the firing frequency to a point where the standing waves in the chambers have one wave length that is smaller than the tube diameter. This permits the exploded wave to take on a spherical rather than a plane wave shape to produce higher pressures and output velocities in the exhaust diffuser. Raising the frequency also reduces the physical length of the chambers since wave length equals pulse velocity divided by frequency.

The advantages of the modification shown in FIG. 3 essentially are the same as the one illustrated in FIG. 1. As already indicated, the principle advantage lies in the significant reduction of exhaust noise achieved by utilizing the high velocity, low pressure gases to drive the turbine. Further, the push-pull effect achieved by employing the plural number of tubes which alternately are fired and compressed permits weight and fuel consumption economies.

Obviously many modifications and variations of the present invention are possible in the light of the above teachings. It is therefore to be understood that within the scope of the appended claims the invention may be practiced otherwise than as specifically described.

I claim:

1. A method for effectively cancelling pressure pulse noise from the exhaust of a turbine-driven jet engine of a type having an elongate gas combustion chamber in the opposite ends of which fuel alternately and repetitively is ignited for generating combustion gas pressure pulses in the form of a sinusoidally-pulsating standing wave having pressure anti-nodes and velocity nodes at its ends, comprising:
    setting the frequency of said alternating ignitions in accordance with the chamber length to provide a standing wave having an even multiple of quarter wave lengths with a pressure node and velocity anti-node at its midway point,
    discharging said combustion gases into a storage reservoir at said midway point,
    storing said discharged gases in said reservoir, and
    delivering said stored gases to said turbine to produce its drive,
    said discharge of said gases at said midway pressure node point effectively cancelling the high pressure of combustion from said stored gases so as to effectively cancel pressure pulse noise from said jet engine exhaust, and said storage of high velocity gases derived from said velocity anti-node discharge smoothing the pulsating characteristics of said gases sufficiently to permit delivery to said turbine at a relatively fixed velocity rate.

2. A method of effectively cancelling pressure pulse noise from the exhaust of a turbine-drive engine comprising:
    producing the motive power for said turbine by alternately and repetitively igniting fuel in the opposite ends of an elongate combustion chamber to produce combustion gas pressure pulses in the form of a sinusoidally-pulsating standing wave having pressure anti-nodes and velocity nodes at its ends,
    setting the frequency of said alternating ignitions in accordance with the chamber length to provide a standing wave having an even number of quarter wave lengths with a pressure node and velocity anti-node at its midway point,
    discharging said combustion gases into a storage reservoir at said midway point,
    storing said discharged gases in said reservoir, and
    delivering said stored gases to said turbine to produce its drive,
    said discharge of said gases at said midway pressure node point effectively cancelling the high pressure of combustion from said stored gases so as to effectively cancel pressure pulse noise from said jet engine exhaust, and said storage of high velocity gases derived from said velocity anti-node discharge smoothing the pulsating characteristics of said gases sufficiently to permit delivery to said turbine at a relatively fixed velocity rate.

3. A low noise jet engine propulsion turbine comprising:
    a plurality of combustion units each formed of at least two combustion tubes having outer and inner end portions, said outer end portions being disposed end-to-end for forming an elongate closed-end combustion chamber of a length approximately equal the combined length of said tubes; each of said tubes further having a common discharge opening disposed centrally of the longitudinal length of the chamber,
    means for intermittently at a fixed predetermined firing frequency igniting said increments for generating positive pressure pulses for forming a standing wave in said chamber characterized by the presence of pressure anti-nodes at the closed ends of each of its tubes;
    reservoir means communicably receiving the burning gas discharge from said discharge opening, and
    discharge-driven turbine means communicating with said reservoir means for generating said propulsion force,
    said chamber having an end-to-end length equal to an even multiple of a quarter wave length of said standing wave as determined by said fixed firing frequency,
    whereby said central discharge opening is disposed at a standing wave pressure node for effectively cancelling the pulse noise energy of the burning gases delivered to said reservoir and at a standing wave velocity anti-node for discharging high velocity gases into said reservoir means,
    said reservior means smoothing the standing wave sinusoidal oscillations of said received high velocity gases for delivery to said turbine means.

4. The propulsion turbine of claim 3 further including timing means for at least initially igniting increments in opposite ends of said chamber in a sequential alternating manner whereby said positive pressure pulses generated at each end alternately travel through the chamber for compressing the increments admitted at the other end, said travelling pulse creating a low pressure area in its wave for admitting said increments.

5. The propulsion turbine of claim 4 wherein the chamber formed by said tubes is circular in cross section and said timing means generates pressure pulses at a firing frequency adapted to form a standing wave having a wave length less than the circular diameter of the chamber whereby the wave shape of the burning gases is generally spherical for maximizing the propulsion pressure.

6. The propulsion turbine of claim 3 wherein each combustion chamber tube is formed with an open end, said open ends facing one another in close proximity for forming said common discharge opening.

7. The propulsion turbine of claim 3 wherein said tubes of each chamber are interconnected medially of their closed end portions for providing a continous combustion chamber, said common opening being provided at said medial point.

8. The propulsion turbine of claim 3 wherein each combustion chamber includes a plural number of tubes in multiples of three.

9. The propulsion turbine of claim 3 further including: diffuser means communicating said reservoir means with turbine means.

10. The propulsion turbine of claim 3 wherein said reservoir means is common to all of the combustion units of the gas turbine.

* * * * *